(12) United States Patent
Durham et al.

(10) Patent No.: US 8,499,151 B2
(45) Date of Patent: *Jul. 30, 2013

(54) SECURE PLATFORM VOUCHER SERVICE FOR SOFTWARE COMPONENTS WITHIN AN EXECUTION ENVIRONMENT

(75) Inventors: David Durham, Beaverton, OR (US); Hormuzd M. Khosravi, Portland, OR (US); Uri Blumenthal, Fair Lawn, NJ (US); Men Long, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,382

(22) Filed: Mar. 5, 2012

(65) Prior Publication Data

US 2012/0226903 A1    Sep. 6, 2012

Related U.S. Application Data

(63) Continuation of application No. 11/864,573, filed on Sep. 28, 2007, now Pat. No. 8,132,003.

(51) Int. Cl.
*H04L 29/06* (2006.01)

(52) U.S. Cl.
USPC ........... 713/164; 711/6; 711/163; 718/1; 726/15; 726/27; 713/176; 713/170; 713/169; 713/150; 713/190; 713/193; 380/255; 380/282; 380/285

(58) Field of Classification Search
USPC .......... 713/164, 169, 170, 176, 150, 190, 713/193; 380/255, 282, 285; 717/176; 726/27, 726/15; 711/6, 163; 718/1
See application file for complete search history.

(56) References Cited

U.S. PATENT DOCUMENTS

| | | | |
|---|---|---|---|
| 5,301,287 | A | 4/1994 | Herrell et al. |
| 5,312,673 | A | 5/1994 | Dressler |
| 5,379,400 | A | 1/1995 | Barakat et al. |
| 5,619,723 | A | 4/1997 | Jones et al. |
| 5,634,043 | A | 5/1997 | Self et al. |

(Continued)

FOREIGN PATENT DOCUMENTS

| | | |
|---|---|---|
| WO | 98/47072 A1 | 10/1998 |
| WO | 01/42874 A2 | 6/2001 |

OTHER PUBLICATIONS

Draheim, "AMD64/EM64T—The Coming Marker", Retrieved on Jul. 12, 2012, 4 pages. Available at: http://guidod.homelinux.org/article/em64t.print.html.

(Continued)

*Primary Examiner* — April Y Blair
(74) *Attorney, Agent, or Firm* — Garrett IP, LLC

(57) ABSTRACT

Apparatuses, articles, methods, and systems for secure platform voucher service for software within an execution environment. An embodiment includes the ability for a Virtual Machine Monitor, Operating System Monitor, or other underlying platform capability to restrict memory regions for access only by authenticated, authorized and verified software components. A provisioning remote entity or gateway only needs to know a platform's public key or certificate hierarchy to receive verification for any component. The verification or voucher helps assure to the remote entity that no malware running in the platform or on the network will have access to provisioned material. The underlying platform to lock and unlock secrets on behalf of the authenticated/authorized/verified software component provided in protected memory regions only accessible to the software component.

9 Claims, 6 Drawing Sheets

U.S. PATENT DOCUMENTS

| | | | |
|---|---|---|---|
| 5,687,370 | A | 11/1997 | Garst et al. |
| 5,751,989 | A | 5/1998 | Harrison |
| 5,926,549 | A | 7/1999 | Pinkas |
| 5,944,821 | A | 8/1999 | Angelo |
| 5,966,531 | A | 10/1999 | Skeen et al. |
| 5,987,557 | A | 11/1999 | Ebrahim |
| 5,991,881 | A | 11/1999 | Conklin et al. |
| 6,105,137 | A | 8/2000 | Graunke et al. |
| 6,163,834 | A | 12/2000 | Garcia et al. |
| 6,321,276 | B1 | 11/2001 | Forin |
| 6,487,643 | B1 | 11/2002 | Khare et al. |
| 6,496,847 | B1 | 12/2002 | Bugnion et al. |
| 6,542,919 | B1 | 4/2003 | Wendorf et al. |
| 6,553,438 | B1 | 4/2003 | Coffman et al. |
| 6,567,897 | B2 | 5/2003 | Lee et al. |
| 6,571,333 | B1 | 5/2003 | Jain et al. |
| 6,658,515 | B1 | 12/2003 | Larson et al. |
| 6,671,791 | B1 | 12/2003 | McGrath |
| 6,684,305 | B1 | 1/2004 | Deneau |
| 6,738,882 | B1 | 5/2004 | Gau |
| 6,751,720 | B2 | 6/2004 | Barroso et al. |
| 6,751,737 | B1 | 6/2004 | Russell et al. |
| 6,760,787 | B2 | 7/2004 | Forin |
| 6,823,433 | B1 | 11/2004 | Barnes et al. |
| 6,832,257 | B1 | 12/2004 | Gamo |
| 6,931,540 | B1 | 8/2005 | Edwards et al. |
| 6,941,458 | B1 | 9/2005 | Ellison et al. |
| 6,957,199 | B1 | 10/2005 | Fisher |
| 6,961,852 | B2 | 11/2005 | Craft |
| 6,996,551 | B2 | 2/2006 | Hellerstein et al. |
| 6,996,710 | B1 | 2/2006 | Ellison et al. |
| 7,010,630 | B2 | 3/2006 | Pagan |
| 7,013,481 | B1 | 3/2006 | Ellison et al. |
| 7,028,229 | B2 | 4/2006 | McGuire et al. |
| 7,082,615 | B1 | 7/2006 | Ellison et al. |
| 7,093,295 | B1 | 8/2006 | Saito |
| 7,103,779 | B2 | 9/2006 | Kiehtreiber et al. |
| 7,194,634 | B2 | 3/2007 | Ellison et al. |
| 7,225,325 | B2 | 5/2007 | Rhoades |
| 7,328,453 | B2 | 2/2008 | Merkle, Jr. et al. |
| 7,350,072 | B2 | 3/2008 | Zimmer et al. |
| 7,409,472 | B2 | 8/2008 | Iwatani et al. |
| 7,467,370 | B2 | 12/2008 | Proudler et al. |
| 7,478,394 | B1 | 1/2009 | de Dinechin et al. |
| 7,506,122 | B1 | 3/2009 | Agesen et al. |
| 7,542,026 | B2 | 6/2009 | Pagan |
| 7,558,966 | B2 | 7/2009 | Durham et al. |
| 7,581,256 | B2 | 8/2009 | Cockerille et al. |
| 7,587,612 | B2 | 9/2009 | Savagaonkar et al. |
| 7,594,124 | B2 | 9/2009 | Durham et al. |
| 7,603,484 | B2 | 10/2009 | Dai et al. |
| 7,653,727 | B2 | 1/2010 | Durham et al. |
| 7,669,242 | B2 | 2/2010 | Sahita et al. |
| 7,734,926 | B2 | 6/2010 | Morais |
| 7,739,517 | B2 | 6/2010 | Sahita et al. |
| 7,761,674 | B2 | 7/2010 | Durham et al. |
| 7,953,980 | B2 | 5/2011 | Schluessler et al. |
| 8,132,003 | B2 | 3/2012 | Durham et al. |
| 2001/0002882 | A1 | 6/2001 | Shimazaki et al. |
| 2001/0014157 | A1 | 8/2001 | Hashimoto et al. |
| 2002/0013889 | A1 | 1/2002 | Schuster et al. |
| 2002/0029308 | A1 | 3/2002 | Babaian et al. |
| 2002/0082824 | A1* | 6/2002 | Neiger et al. ............ 704/2 |
| 2002/0120871 | A1 | 8/2002 | Watkins et al. |
| 2002/0129212 | A1 | 9/2002 | Lee et al. |
| 2003/0005239 | A1 | 1/2003 | Dover |
| 2003/0005272 | A1 | 1/2003 | Nalawadi et al. |
| 2003/0037237 | A1 | 2/2003 | Abgrall et al. |
| 2003/0061540 | A1 | 3/2003 | Lee et al. |
| 2003/0097496 | A1 | 5/2003 | Gabryjelski |
| 2003/0097579 | A1 | 5/2003 | England et al. |
| 2003/0135685 | A1 | 7/2003 | Cowan |
| 2003/0159055 | A1 | 8/2003 | Robbins et al. |
| 2003/0217250 | A1 | 11/2003 | Bennett et al. |
| 2003/0229794 | A1 | 12/2003 | Sutton et al. |
| 2003/0229808 | A1 | 12/2003 | Heintz et al. |
| 2003/0235310 | A1 | 12/2003 | Saito et al. |
| 2004/0030911 | A1 | 2/2004 | Isozaki et al. |
| 2004/0039924 | A1 | 2/2004 | Baldwin et al. |
| 2004/0044872 | A1 | 3/2004 | Scott |
| 2004/0153998 | A1 | 8/2004 | McGuire et al. |
| 2004/0221200 | A1 | 11/2004 | Armstrong et al. |
| 2004/0226009 | A1 | 11/2004 | Mese et al. |
| 2004/0268013 | A1 | 12/2004 | Pagan |
| 2005/0027988 | A1 | 2/2005 | Bodrov |
| 2005/0060568 | A1 | 3/2005 | Beresnevichiene et al. |
| 2005/0081199 | A1 | 4/2005 | Traut |
| 2005/0132122 | A1 | 6/2005 | Rozas |
| 2005/0138417 | A1 | 6/2005 | McNerney et al. |
| 2005/0188198 | A1 | 8/2005 | Ellison et al. |
| 2005/0198051 | A1 | 9/2005 | Marr et al. |
| 2005/0213768 | A1 | 9/2005 | Durham et al. |
| 2005/0216577 | A1 | 9/2005 | Durham et al. |
| 2005/0223220 | A1 | 10/2005 | Campbell et al. |
| 2005/0223221 | A1 | 10/2005 | Proudler et al. |
| 2005/0251857 | A1* | 11/2005 | Schunter et al. ............ 726/16 |
| 2005/0278499 | A1 | 12/2005 | Durham et al. |
| 2005/0278563 | A1 | 12/2005 | Durham et al. |
| 2005/0289311 | A1 | 12/2005 | Durham et al. |
| 2005/0289542 | A1 | 12/2005 | Uhlig et al. |
| 2006/0004944 | A1 | 1/2006 | Vij et al. |
| 2006/0026569 | A1 | 2/2006 | Oerting et al. |
| 2006/0047972 | A1 | 3/2006 | Morais |
| 2006/0156398 | A1 | 7/2006 | Ross et al. |
| 2006/0161761 | A1 | 7/2006 | Schwartz et al. |
| 2006/0236125 | A1 | 10/2006 | Sahita et al. |
| 2006/0236127 | A1* | 10/2006 | Kurien et al. ............ 713/193 |
| 2006/0259734 | A1 | 11/2006 | Sheu et al. |
| 2006/0294596 | A1 | 12/2006 | Govindarajan et al. |
| 2007/0005935 | A1 | 1/2007 | Khosravi et al. |
| 2007/0005957 | A1 | 1/2007 | Sahita et al. |
| 2007/0005992 | A1 | 1/2007 | Schluessler et al. |
| 2007/0006175 | A1 | 1/2007 | Durham et al. |
| 2007/0006307 | A1 | 1/2007 | Hahn et al. |
| 2007/0156999 | A1 | 7/2007 | Durham et al. |
| 2008/0077767 | A1 | 3/2008 | Khosravi et al. |
| 2009/0172814 | A1 | 7/2009 | Khosravi et al. |
| 2011/0231668 | A1 | 9/2011 | Schluessler et al. |

OTHER PUBLICATIONS

"Bus", A Word Definition From the Webopedia Computer Dictionary, Retrieved on May 7, 2012, pp. 1-2. Available at: http://www.webopedia.com/TERM/B/bus.html.

"Direct Memory Access (DMA) Modes and Bus Mastering DMA", The PC Guide, Retrieved on May 7, 2012, pp. 1-3. Available at: http://www.pcguide.com/ref/hdd/if/ide/modesDMA-c.html.

"DMA", A Word Definition From the Webopedia Computer Dictionary, Retrieved on May 7, 2012, pp. 1-2. Available at: http://www.webopedia.com/TERM/D/DMA.html.

"Executable and Linkable Format (ELF)", TIS Committee, Tools Interface Standards (TIS), Portable Formats Specification, Version 1.1, Oct. 1993, 60 pages.

"Kernel", A Word Definition From the Webopedia Computer Dictionary, Retrieved on May 5, 2012, pp. 1-2. Available at: http://www.webopedia.com/TERM/K/kernel.html.

"Mac OS X ABI Mach-O File Format Reference", Apple Developer, Overview, Feb. 4, 2009, pp. 1-70.

"Microsoft Portable Executable and Common Object File Format Specification", Microsoft Corporation, Revision 6.0, Feb. 1999, 74 pages.

"Red Hat Enterprise Linux 4", Red Hat, Inc., Using as, the Gnu Assembler, copyright 2003, 280 pages.

"Standardizing Out-of-Band Management Console Output and Terminal Emulation (VT-UTF8 and VT100+)", Windows Platform Design Notes, Designing Hardware for the Microsoft Windows Family of Operating Systems, PREVIEW Draft Version 0.90, Oct. 24, 2001, pp. 1-15.

Collins, Robert R., "Intel's System Management Mode", System Management Mode Overview, Retrieved on May 5, 2012, pp. 1-4. Available at: http://www.rcollins.org/ddj/Jan97/Jan97.html.

Zhang, "Memory Management in JikesNode Operating System", A thesis submitted to the University of Manchester for the degree of Master of Science in the Faculty of Science and Engineering, 2005, 1 page Available at: http://www.citeulike.org/user/robertburrelldonkin/article/6743255.

Duc, et al., "CryptoPage: an Efficient Secure Architecture with Memory Encryption, Integrity and Information Leakage Protection", 22nd Annual Applications Conference on Computer Security, ACSAC, Dec. 2006, pp. 483-492.

Grevstad, Eric, "CPU-Based Security: The NX Bit", Hardware Central, Windows XP SP2 Stars AMD Antivirus Feature, May 24, 2004, pp. 1-3.

Levy, et al, "Hiding Your Wares: Transparently Retrofitting Memory Confidentiality into Legacy Applications", IEEE International Conference on Communications on Jun. 24-28, 2007, pp. 1368-1372.

Markatos, et al, "User-Level DMA without Operating System Kernel Modification", IEEE 3rd International Symposium on High Performance Computer Architecture, Feb. 1-5, 1997, pp. 322-331.

International Preliminary Report on Patentability received for International Patent Application No. PCT/US2005/022577, mailed on Jan. 9, 2007, 6 pages.

International Search Report and Written Opinion received for International Patent Application No. PCT/US2005/022577, mailed on Nov. 24, 2005, 8 pages.

Sheveley, "Enhanced Virtualization on Intel Architecture-Based Servers", Technology@Intel Magazine, Apr. 2005, pp. 1-9.

Uhlig, et al., "Intel Virtualization Technology", IEEE Computer Society, Cover Feature, May 2005, pp. 48-56.

Wagle, et al., "StackGuard: Simple Stack Smash Protection for GCC", Imunix, Inc., GCC Developers Summit 2003, Aug. 2001, pp. 243-256.

Yan, et al, "Improving Cost, Performance, and Security of Memory Encryption and Authentication", Proceedings of the 33rd International Symposium on Computer Architecture (ISCA-33), Jun. 2006, pp. 179-190.

* cited by examiner

SECURE PLATFORM VOUCHER SERVICE FOR SOFTWARE COMPONENTS WITHIN AN EXECUTION ENVIRONMENT

CROSS-REFERENCE TO RELATED APPLICATIONS

This application is a continuation of U.S. patent application Ser. No. 11/864,573, filed Sep. 28, 2007 now U.S. Pat. No. 8,132,003 entitled "SECURE PLATFORM VOUCHER SERVICE FOR SOFTWARE COMPONENTS WITHIN AN EXECUTION ENVIRONMENT" which is also related to U.S. patent application Ser. No. 11/173,851, filed on Jun. 30, 2005 and titled "SIGNED MANIFEST FOR RUN-TIME VERIFICATION OF SOFTWARE PROGRAM IDENTITY AND INTEGRITY"; U.S. patent application Ser. No. 11/322,669, filed on Dec. 30, 2005 and titled "IDENTIFIER ASSOCIATED WITH MEMORY LOCATIONS FOR MANAGING MEMORY ACCESSES"; U.S. patent application Ser. No. 11/395,488, filed on Mar. 30, 2006 and titled "INTRA-PARTITIONING OF SOFTWARE COMPONENTS WITHIN AN EXECUTION ENVIRONMENT"; and U.S. patent application Ser. No. 11/833,073, filed on Aug. 2, 2007 and titled "SECURE VAULT SERVICE FOR SOFTWARE COMPONENTS WITHIN AN EXECUTION ENVIRONMENT", all of which are incorporated herein by reference.

BACKGROUND

Software components are subject to complex and evolving attacks by malware (e.g., man-in-the-middle (MITM), rootkit, spyware, etc.) seeking to gain control of computer systems. These attacks can take on a variety of different forms ranging from attempts to crash the software component to subversion of the component for alternate purposes. Issues arise when a remote entity or gateway needs assurance that it is provisioning the prescribed unmodified version of one or more software components in the computer system.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Embodiments of the present invention may provide a method, apparatus, and system for secure platform voucher service for software components within an execution environment on a platform. In embodiments, secure platform voucher service addresses the issue of remotely validating software components that run on a platform as part of provisioning the software components with secret keys, state and/or other configuration information, etc. Examples of the components include, but are not limited to, virtual private networks (VPNs), intrusion detection systems (IDSes), intrusion prevention systems (IPSes) and digital rights management (DRM) applications.

In embodiments of the invention, a provisioning remote entity or gateway only needs to know a platform's public key or certificate hierarchy in order to receive verification proof for any component in the platform. The verification proof or voucher helps to assure to the remote entity that no man-in-the-middle, rootkit, spyware or other malware running in the platform or on the network will have access to the provisioned material.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
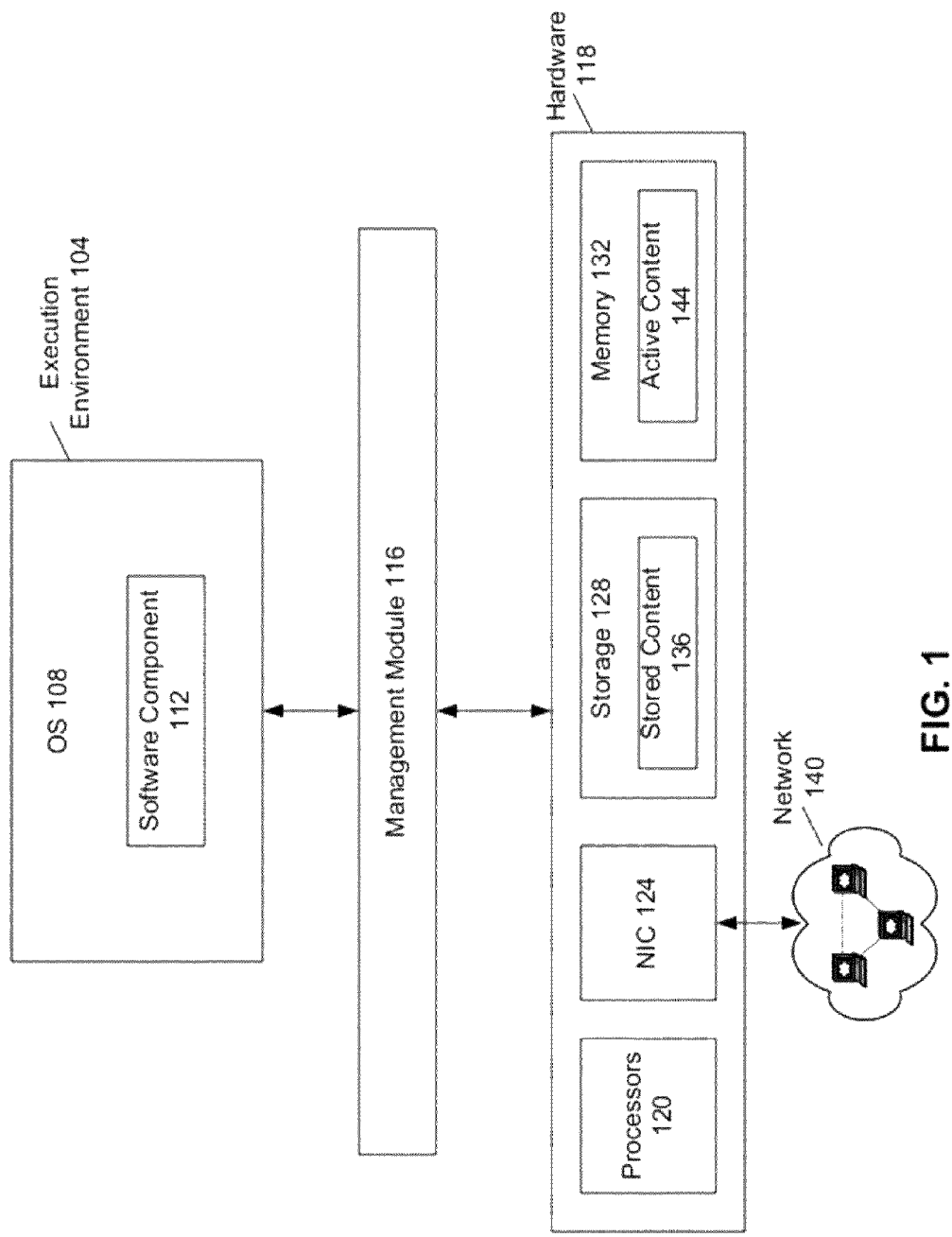
FIG. 1 illustrates a platform to provide secure platform voucher service for software components within an execution environment, in accordance with an embodiment of the present invention.

FIG. 1 illustrates a platform 100 to provide for secure platform voucher service for software components within an execution environment, in accordance with an embodiment of the present invention. The platform 100 may have an execution environment 104, which may be the domain of an executing operating system (OS) 108. The OS 108 may be a component configured to execute and control general operation of other components within the execution environment 104, such as the software component 112, subject to intra-partition memory access protections provided to selected components by an underlying management module 116, to be discussed in further detail below.

In some embodiments, the component 112 may be a supervisory-level component, e.g., a kernel component. In various embodiments, a kernel component may be services (e.g., loader, scheduler, memory manager, etc.), extensions/drivers (e.g., for a network card, a universal serial bus (USB) interface, a disk drive, etc.), or a service-driver hybrid (e.g., intrusion detectors to watch execution of code). Alternatively, in embodiments, the component 112 may be an application process, thread, or other user space program, service or library.

As used herein, the term "component" is intended to refer to programming logic and associated data that may be employed to obtain a desired outcome. The term component may be synonymous with "module" or "agent" and may refer to programming logic that may be embodied in hardware or firmware, or in a collection of software instructions, possibly having entry and exit points, written in a programming language, such as, for example, C++, Intel Architecture 32 bit (IA-32) executable code, etc.

A software component may be compiled and linked into an executable program, or installed in a dynamic link library, or may be written in an interpretive language such as BASIC. It will be appreciated that software components may be callable from other components or from themselves, and/or may be invoked in response to detected events or interrupts. Software instructions may be provided in a machine accessible medium, which when accessed, may result in a machine performing operations or executions described in conjunction with components of embodiments of the present invention. Machine accessible medium may be firmware, e.g., an electrically erasable programmable read-only memory (EEPROM), or other recordable/non-recordable medium, e.g., read-only memory (ROM), random access memory (RAM), magnetic disk storage, optical disk storage, etc. It will be further appreciated that hardware components may be comprised of connected logic units, such as gates and flip-flops, and/or may be comprised of programmable units, such as programmable gate arrays or processors. In some embodiments, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the invention.

In addition to intra-partitioning selected components of the execution environment 104, the management module 116 may arbitrate general component access to hardware resources 118 such as one or more processor(s) 120, network interface controller (NIC) 124, storage 128, and/or memory 132.

The processor(s) 120 may execute programming instructions of components of the platform 100. The processor(s) 120 may be single and/or multiple-core processor(s), controller(s), application specific integrated circuit(s) (ASIC(s)), etc.

In an embodiment, storage 128 may represent non-volatile storage to store persistent content to be used for the execution of the components on the platform 100, such as, but not limited to, operating system(s), program files, configuration files, etc. In an embodiment, storage 128 may include stored content 136, which may represent the persistent store of source content for the component 112. The persistent store of source content may include, e.g., executable code store that may have executable files and/or code segments, links to other routines (e.g., a call to a dynamic linked library (DLL)), a data segment, etc.

In various embodiments, storage 128 may include integrated and/or peripheral storage devices, such as, but not limited to, disks and associated drives (e.g., magnetic, optical), universal serial bus (USB) storage devices and associated ports, flash memory, ROM, non-volatile semiconductor devices, etc.

In various embodiments, storage 128 may be a storage resource physically part of the platform 100 or it may be accessible by, but not necessarily a part of, the platform 100. For example, the storage 128 may be accessed by the platform 100 over a network 140 via the network interface controller 124.

Upon a load request, e.g., from a loading component or agent of the OS 108, the management module 116 and/or the OS 108 may load the stored content 136 from storage 128 into memory 132 as active content 144 for operation of the component 112 in the execution environment 104.

In various embodiments, the memory 132 may be volatile storage to provide active content for operation of components on the platform 100. In various embodiments, the memory 132 may include RAM, dynamic RAM (DRAM), static RAM (SRAM), synchronous DRAM (SDRAM), dual-data rate RAM (DDRRAM), cache, etc.

In some embodiments, the memory 132 may organize content stored therein into a number of groups of memory locations. These organizational groups, which may be fixed and/or variable sized, may facilitate virtual memory management. The groups of memory locations may be pages, segments, or a combination thereof.

A virtual memory utilizing paging may facilitate the emulation of a large logical/linear address space with a smaller physical memory page. Therefore, the execution environment 104 may provide a virtual execution environment in which the components may operate, which may then be mapped into physical pages of the memory 132. Page tables maintained by the OS 108 and/or management module 116 may map the logical/linear addresses provided by components of the execution environment 104 to physical address of the memory 132. More details of the implementation of paging, and in particular paging with respect to intra-partitioning of components, may be given below in accordance with embodiments of this invention.

In various embodiments, the component 112, or portions thereof, may be selected for intra-partitioning to support secure platform voucher services. Here, the management module 116 may identify and partition off portions of the component 112 to control access by the OS 108 or other components to the component 112. Partitioned portions may include any portion, up to all, of the particular component. A partitioned portion may be sequestered, either physically or virtually, from other components within the same execution environment, such that intra-execution environment accesses may be monitored and restricted, if necessary, by the underlying platform. Intra-partitioning may facilitate insulation of, e.g., component 112 from the OS 108, without requiring that the component 112 operate in an entirely separate execution environment, with a separate OS. Intra-partitioning may also afford the component 112 a level of protection from other components, even those of similar or higher privilege levels, within the execution environment 104 that may be compromised in some manner, e.g., by malware, rootkits, critical runtime failures, etc. Embodiments of this invention may provide for this protection and secure platform voucher services while still allowing permitted interactions between the component 112 and other components, e.g., the OS 108, of the execution environment 104. Controlling access by the OS 108 to the component 112 may include various levels of access restrictions, as will be discussed below in further detail.

In various embodiments, intra-partitioning of components to support secure platform voucher services within an execution environment may be useful in a platform having multiple, execution environments, such as virtual machines operating in a virtualization technology (VT) enabled platform. In such an embodiment, a management module may include, or be a part of, a virtual machine monitor (VMM). For example, in embodiments, management module 116 may be implemented as a hypervisor-based module.

Figure 2:
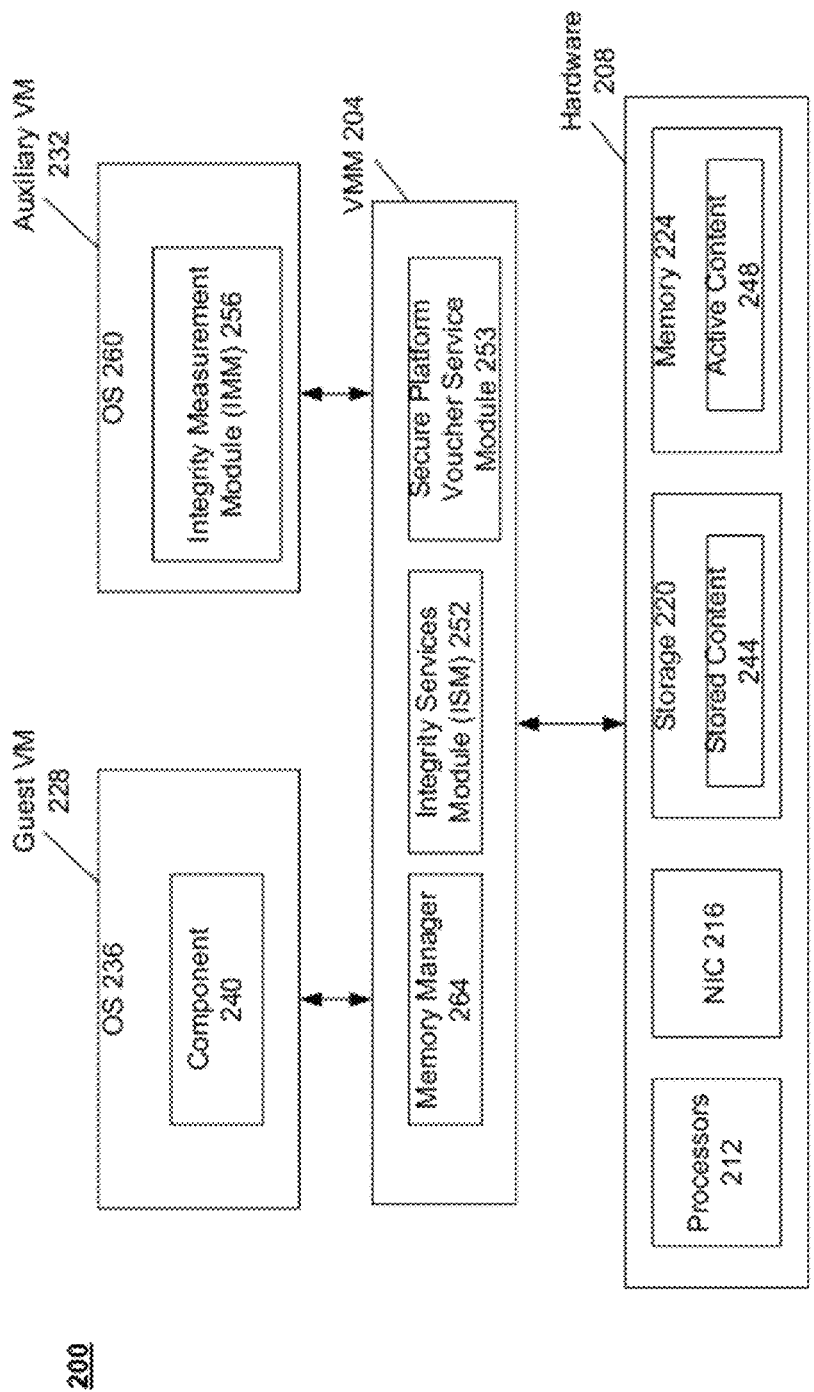
FIG. 2 illustrates a platform utilizing parallel execution environments, in accordance with an embodiment of the present invention.

FIG. 2 illustrates a platform 200 utilizing virtualization to provide parallel execution environments in accordance with an embodiment of this invention. In various embodiments, the platform 200 may be similar to, and substantially interchangeable with, the platform 100. Furthermore, elements described below may be similar to, and substantially interchangeable with, like-named elements described above, and vice versa.

In this embodiment a management module, e.g., virtual machine monitor (VMM) 204, on the platform 200 may present multiple abstractions and/or views of the platform hardware 208, e.g., one or more processor(s) 212, network interface controller (NIC) 216, storage 220, and/or memory 224, to the one or more independently operating execution environments, or "virtual machines (VMs)," e.g., guest VM 228 and auxiliary VM 232. The auxiliary VM 232 may be configured to execute code independently and securely isolated from the guest VM 228 and may prevent components of the guest VM 228 from performing operations that would alter, modify, read, or otherwise affect the components of the auxiliary VM 232. While the platform 200 shows two VMs, other embodiments may employ any number of VMs.

The components operating in the guest VM 228 and auxiliary VM 232 may each operate as if they were running on a dedicated computer rather than a virtual machine. That is, components operating in the guest VM 228 and auxiliary VM 232 may each expect to control various events and have complete access to hardware 208. The VMM 204 may manage VM access to the hardware 208. The VMM 204 may be implemented in software (e.g., as a stand-alone program and/or a component of a host operating system), hardware, firmware, and/or any combination thereof.

The guest VM 228 may include an OS 236 and component 240. Upon a designated event, the VMM 204 may identify and partition off portions of the component 240 to control access to the partitioned portions by the OS 236 or other components. One or more of these partitioned portions may be used to represent a secure area in memory. In various embodiments, a designated event may be when stored content 244 is loaded from storage 220 to memory 224, as active content 248 or when the component 240 requests secure platform voucher services. However, in various embodiments, other designated events may be additionally/alternatively used.

Figure 3:
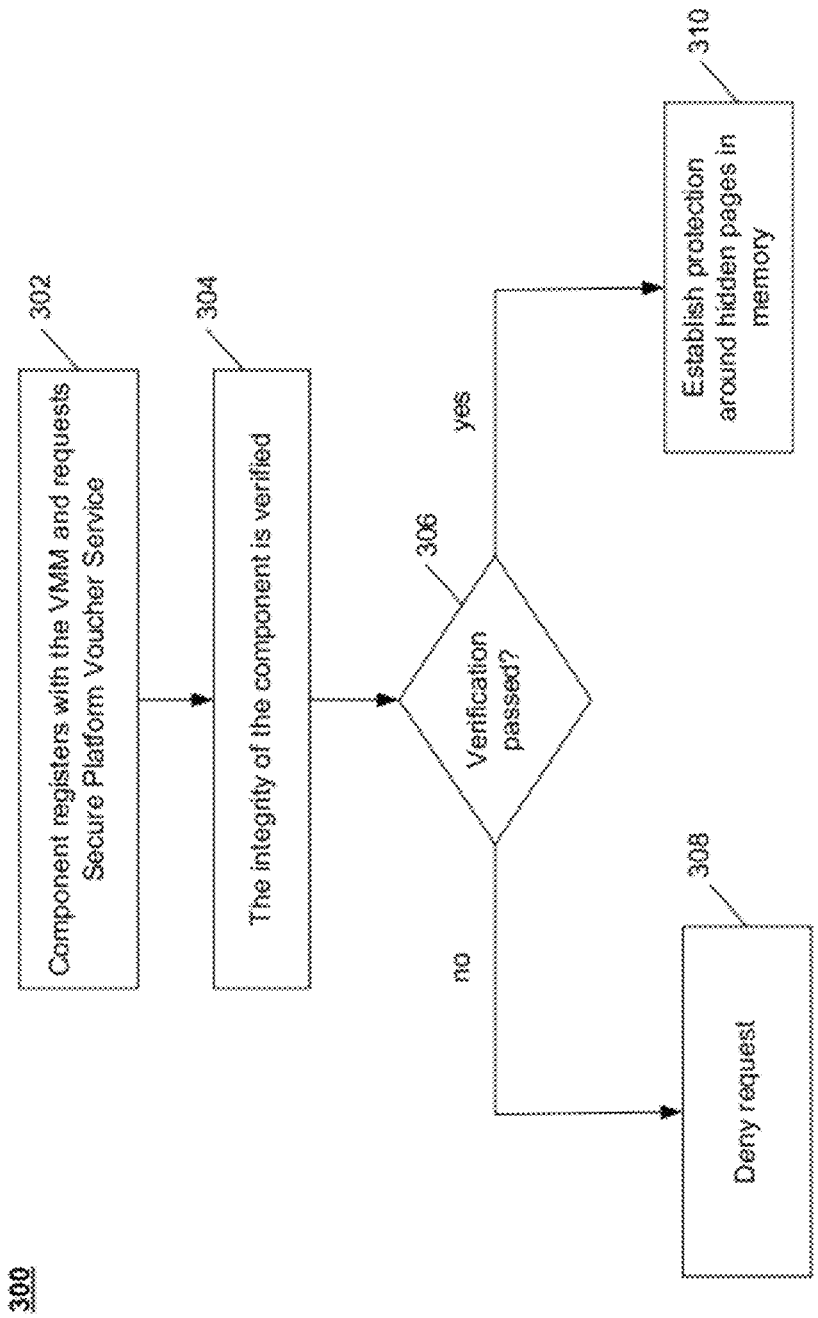
FIG. 3 illustrates operational phases of secure platform voucher service for software components within an execution environment, in accordance with an embodiment of the present invention.

Intra-partition based protections to provide secure platform voucher service may be provided to component 240 as described in FIG. 3 in accordance with an embodiment of this invention. Operational phases shown in FIG. 3 may be referenced by numerals within parentheses. Referring to FIG. 3, the component 240 may register with the VMM 204, and more particularly, with an integrity services module (ISM) 252 of the VMM 204 for protection (block 302). At this time, the component 240 may also request for secure platform voucher service. In various embodiments, the registration may take place upon an occurrence of a registration event, e.g., loading of the active content 248 into memory 224, periodically, and/or in some other event-driven manner. In various embodiments, the registration may be initiated by the component 240, another component within the VM 228, e.g., the OS 236, the VMM 204, or a component of the VM 232.

Upon receiving the registration, the ISM 252 may cooperate with an integrity measurement module (IMM) 256 operating in the VM 232 to authenticate and verify the integrity of the component 240 (block 304). Authentication and verification of the integrity of the component 240 may help to prevent unauthorized modification and/or malicious termination, and may ensure that only recognized components may be afforded protection as defined by an administrator, user or other policy. The IMM 256 may operate in the VM domain 232 in the context of an OS 260, or in separate hardware and may, therefore, be largely independent of OS 236. By running outside of the context of the VM 228, the IMM 256 may have accurate and dependable memory measurement capabilities that may not be present, or possibly compromised, in the context of the OS 236. In other embodiments, IMM 256 may operate in the VM domain or guest VM 228. In other embodiments, IMM 256 may operate in the VMM 204.

The IMM 256 may provide the ISM 252 a response to the verification request such as pass, fail, pass w/qualification, fail w/qualification, etc. In various embodiments, qualifications may reflect degrees of integrity verification between pass and fail. The IMM 256 effectively identifies or authenticates the component and its data and assures that it is of the expected, correct form in memory.

In some embodiments, the active content 248 may include an integrity manifest, which may be a collection of information to be used in the verification of the integrity of the component 240. In various embodiments, the integrity manifest may include one or more integrity check values and/or relocation fix-up locations, covering the stored content 244, e.g., code store and/or static and/or configuration settings/data. The IMM 256 may access the integrity manifest from the active content 248 and verify that the component 240 corresponds, in total or in part, to the integrity manifest. The IMM 256 may verify the authenticity of the integrity manifest itself verifying a cryptographic signature over the integrity manifest structure to assure it is unaltered from its correct form. A comparison may be done of the images through, e.g., a byte-by-byte analysis or through analysis of cryptographic hashes.

In various embodiments, the IMM 256 may search for the active content 248 directly in the memory 224, e.g., through a direct memory access (DMA) or direct physical memory access. In various embodiments, the linear address of the component 240 may be provided to the IMM 256, e.g., through the ISM 252, and the IMM 256 may perform a virtual-to-physical mapping to identify the physical memory locations of the active content 248. In an embodiment, the VMM 204 may provide special interfaces to IMM 256 to provide access to active content 248.

In various embodiments, integrity measurement of the active content 248 may be conducted upon the initial registration, periodically, and/or in some other event-driven manner while the component 240 is executing (e.g., request for secure platform voucher service). Integrity measurement upon initial registration request or secure platform voucher service request may help to determine that the initial state of the active content 248 and/or stored content 244 is as expected based on the state of the content at the time it was manufactured, or loaded last. The periodic or event-driven integrity measurements may help to detect attacks that inappropriately change the protected attributes of the active content 248 and/or stored content 244.

Further details of integrity measurements of components are described in U.S. patent application Ser. No. 11/173,851, filed Jun. 30, 2005, referred to and incorporated above.

The ISM 252 may receive a response from IMM 256 reflecting verification of integrity and location in memory of the active content 248 (block 306). If the verification fails, the ISM 252 denies the request and may trigger an alert (block 308). If the verification passes, the ISM 252 may cooperate with a memory manager 264 to intra-partition portions of the component 240 for secure platform voucher services (block 310). Here, protection is established around one or more hidden pages in memory so they may only be accessed by the verified component and/or around the entirety of the component itself.

While FIG. 2 illustrates execution environments being virtual partitions, other embodiments may provide different execution environments through other mechanisms, e.g., using a service processor, protected execution mode (such as System Management Mode SMM or Secure Execution Mode SMX, for example) and/or an embedded microcontroller. In various embodiments, an auxiliary environment may be partitioned from a host environment via a variety of different types of partitions, including a virtualized partition (e.g., a virtual machine in a Virtualization Technology (VT) scheme), as shown above, and/or an entirely separate hardware partition (e.g., utilizing Active Management Technologies (AMT), "Manageability Engine" (ME), Platform Resource Layer (PRL) using sequestered platform resources, System Management Mode (SMM), and/or other comparable or similar technologies). In various embodiments, a VT platform may also be used to implement AMT, ME, and PRL technologies.

Figure 4:
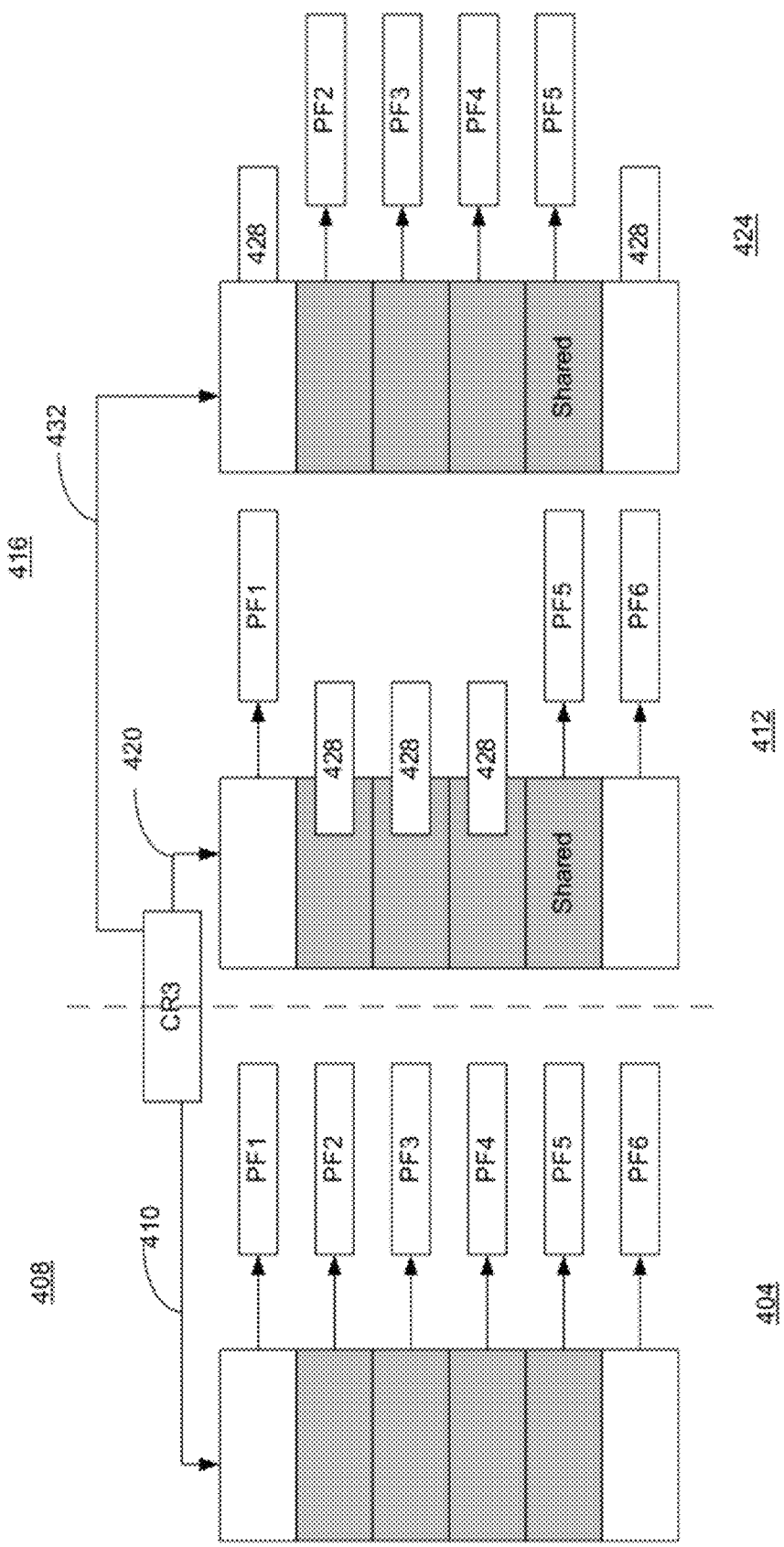
FIG. 4 illustrates intra-partitioning of portions of a component to provide secure platform voucher service in accordance with an embodiment of the present invention.

FIG. 4 illustrates intra-partitioning of portions of the component 240 to support secure platform voucher service in accordance with an embodiment of this invention. In this embodiment, the OS 236 may create a guest page table (GPT) 404 in an OS domain 408 mapping linear addresses of components executing in the VM 228 to physical addresses, or page frames. Component 240 may be set to occupy the $2^{nd}$ through $5^{th}$ page table entries (PTEs), which refer to page frames having active content 248, e.g., PF2-PF5. As is the case in VT platforms, the VMM 204 may monitor and trap register pointer (e.g., CR3) changes. When OS 236 creates GPT 404 and provides a CR3 value 410 pointing to the GPT 404, the VMM 204 may trap on the CR3 change, create an active page table (APT) 412 (which may be a duplicate or shadow copy of the GPT 404) in the VMM domain 416, and change the CR3 value 410 to value 420 pointing to the APT 412. In this way, the VMM 204 can coordinate accesses to the memory 224 from a number of VMs, e.g., VM 228 and VM 232.

In this embodiment, the VMM 204 may also create a protected page table (PPT) 424. The VMM 204 may copy the page frames having the active content 248, e.g., PF2-PF5, into the PPT 424 and assign the page table entries (PTEs) that do not refer to those page frames, e.g., $1^{st}$ PTE and $6^{th}$ PTE, with access characteristics 428 to cause a page fault upon execution. Similarly the APT page mappings for the active content (e.g. $2^{nd}$ through the $4^{th}$ PTE corresponding to PF2-PF4) will have access characteristics to cause a page fault on execution from the active (or OS's) domain. In various embodiments, the access characteristics 428 may be 'not present,' 'execute disabled,' and/or read-only. In an embodiment, the access characteristics 428 may be 'not present' or a combination of 'execute disable' and read-only to prevent unauthorized modifications to the active content 248 from the VM 228. In various embodiments, the setting of the access characteristics 428 may be done by the VMM 204, requested by the authenticated/verified component 240, the IMM 256, and/or by hardware.

The VMM 204 may assign the PTEs of the APT 412 that refer to page frames having partitioned portions of the component 240, e.g., $2^{nd}$ PTE-$4^{th}$ PTE, with access characteristics 428. It may be noted that some page frames, e.g., PF5, may be shared between the partitioned and non-partitioned elements. Therefore, in an embodiment the $5^{th}$ PTE may not have access characteristics 428 set in either APT 412 or PPT 424.

In this embodiment, execution flow between the APT 412 and PPT 424 may be managed as follows. Initially, CR3 may have value 420 pointing to APT 412 representing the execution of the guest operating system. An execution instruction pointer (EIP) may start with the $1^{st}$ PTE of the APT 412 and, upon an attempted access of the $2^{nd}$ PTE, may cause a page fault due to the access characteristics 428. The VMM 204 may take control, and change CR3 from value 420 to value 432, pointing to the PPT 424. The EIP may resume operation at the $2^{nd}$ PTE of the PPT 424, which may be a partitioned element. The EIP may execute through the $3^{rd}$ PTE, the $4^{th}$ PTE and the $5^{th}$ PTE. When the EIP attempts to access the $6^{th}$ PTE, the access characteristics 428 may cause another page fault and the VMM 204 may switch the CR3 back to value 420, for access to the $6^{th}$ PTE from the APT 412.

In some embodiments, the VMM 204 may monitor the execution flow between the APT 412 and PPT 424 to verify that the points the EIP enters and/or exits the PPT 424 are as expected according to the integrity manifest for the component 240 or other policy. Verification that the EIP jumps into the PPT 424 at valid entry points and/or jumps out of the PPT 424 at valid exit points, could facilitate a determination that the component 240 and/or other components in the VM 228 are operating correctly. If the entry/exit point is not as expected, the VMM 204 may determine that the access attempt to the partitioned component 240 is unauthorized and may raise an exception, which in various embodiments could include rejecting the attempted access, redirecting the access attempt to a different or NULL memory region, reporting the rejected access attempt to the OS 236 (for example, by injecting an invalid instruction exception), triggering an interrupt, notifying a separate VM, sending a network notification, and/or causing a halt of the OS 236 as controlled by the VMM 204).

In various embodiments, the valid entry and/or exit points may be predetermined, e.g., at the time the component 240 is compiled, and/or may be dynamic. A dynamic entry and/or exit point may be created, e.g., when an interrupt occurs. For example, an interrupt may occur when the EIP is at the $3^{rd}$ PTE of the PPT 424, the VMM 204 may gain control, verify that the interrupt is authentic, and record the EIP value, processor register values, and call stack information for use as a dynamic exit point. The dynamic exit point may then serve as a valid entry point upon reentry to the partitioned elements of the PPT 424. Note that sensitive data in processor registers and the call stack may be stored as part of the dynamic exit point by the VMM 204 and cleaned/deleted before turning control back to the OS via the interrupt handler. This sensitive data may be restored by the VMM 204 when the corresponding dynamic entry point is executed on returning from the interrupt.

Additionally, in some embodiments an execution state (e.g., a stack state and/or a processor state, e.g., register values) may be recorded at an exit and verified upon reentry. This may provide some assurance that an unauthorized alteration/modification did not occur.

In some embodiments data for an execution state verification may include a copy of the entire state or an integrity check value (ICV) calculation. An ICV may be calculated on, for example, the in parameters of a stack frame by setting the out parameters to default values. Likewise, an ICV may be calculated on the out parameters by setting the in parameters to default values. If the entry/exit point and/or the execution state verification fail, the VMM 204 may issue an exception to the access attempt.

Furthermore, in some embodiments, the VMM 204 may verify that the element calling the partitioned elements (e.g., secure vault or hidden pages), e.g., PF2-PF4, is permitted to access them. For example, the VMM 204 may receive a request from a component to access the partitioned elements. The VMM 204 may identify the component, reference access permissions associated with the partitioned elements, and raise an exception if the access permissions do not permit the identified component to access the partitioned elements.

It may be noted that the page tables shown and described in embodiments of this invention may be simplified for clarity of discussion. In various embodiments of this invention page tables may include multiple levels of indirection and thousands or even millions of entries. Furthermore, in various embodiments entries at different levels may be identified differently than as identified in discussions herein. For example, on an IA-32 platform, the top level may be referred to as a page directory entry (PDE), while the bottom entry may be referred to as a page table entry (PTE). Extended or Nested Page Tables for protection, remapping, and/or segmentation of guest physical memory may also be used. The intra-partitioning discussed herein may be applied to any of these variations/extensions in accordance with embodiments of this invention.

Further embodiments of intra-partitioning of portions of the component 240 are described in U.S. patent application Ser. No. 11/395,488, filed on Mar. 30, 2006, referenced above.

Figure 5:
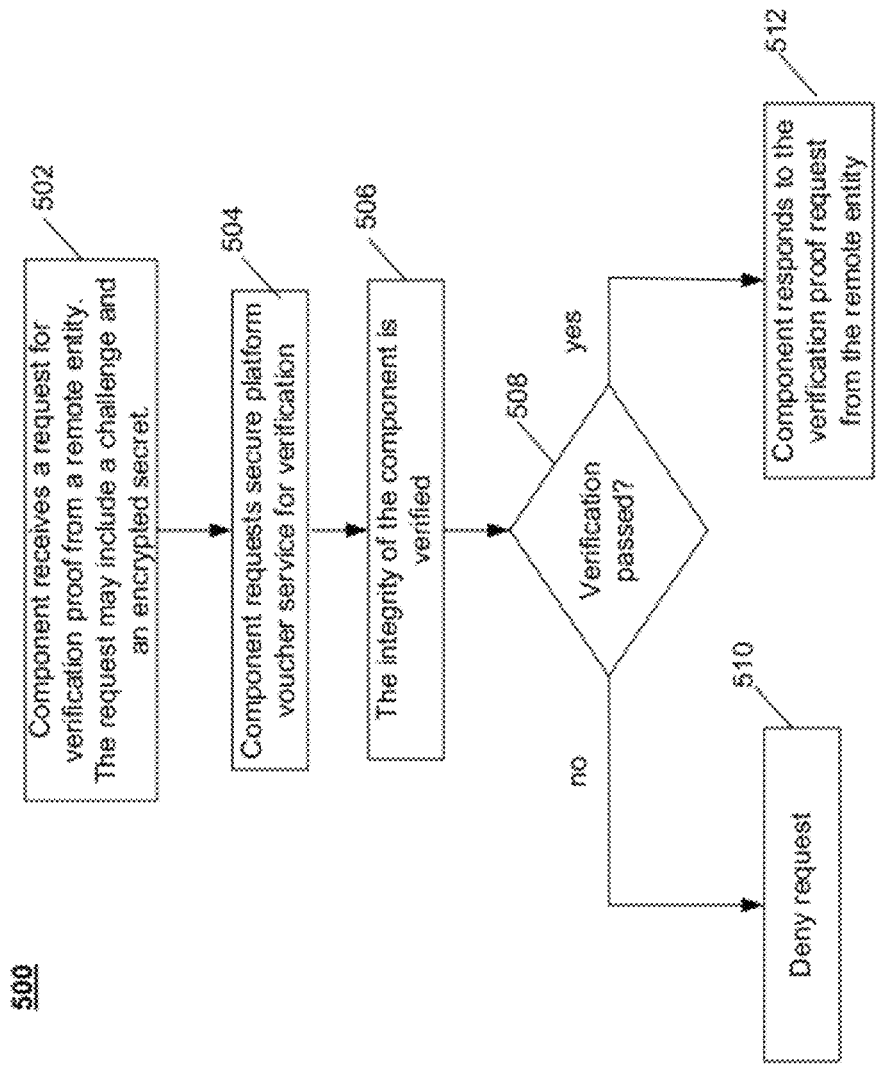
FIG. 5 illustrates operational phases of secure platform voucher service, in accordance with an embodiment of the present invention.
Figure 6:
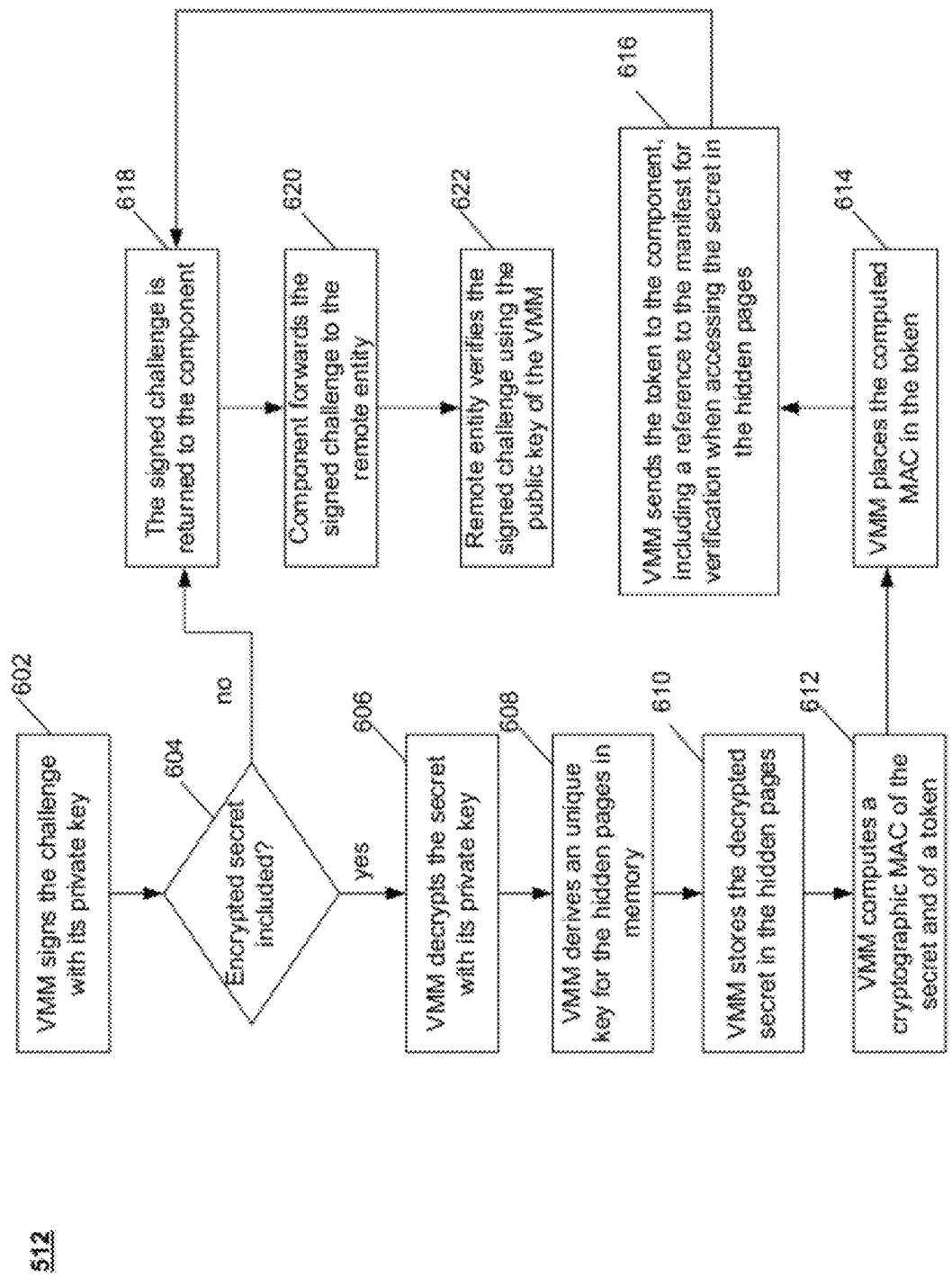
FIG. 6 illustrates operational phases of secure platform voucher service, in accordance with an embodiment of the present invention.

FIGS. 5 and 6 illustrate operational phases of secure platform voucher service, in accordance with an embodiment of the present invention. Operational phases shown in FIGS. 5 and 6 may be referenced by numerals within parentheses. In embodiments, the secure platform voucher services module 253 (FIG. 2) of the VMM 204 may be incorporated into the VMM 204 to perform the secure platform voucher service described herein.

Referring to FIG. 5, the component 240 receives a request for verification proof from a remote entity or gateway (block 502). Here, the remote entity sends a challenge. In addition, the remote entity may also encrypt a secret for the component 240 (e.g., VPN) using the public key of the VMM 204. As will be described in more detail below, the encrypted secret may help to guard against man-in-the-middle (MITM) attacks.

The component 240 requests secure platform voucher service for verification (block 504). The integrity of the component 240 is verified (block 506), as was described above with reference to block 304 of FIG. 3. The ISM 252 may receive a response from IMM 256 reflecting verification of integrity of the active content 248 (block 508). If the verification fails, the ISM 252 denies the request and may trigger an alert (block 510). If the verification passes, the component 240 responds to the verification proof or voucher request from the remote entity (block 512). Block 512 is described in more detail with reference to FIG. 6.

Referring to FIG. 6, the VMM 204 signs the challenge (or its cryptographic transform of it) with its private key (block 602). This may include the manifest data (identity string, etc.) within the signed data. Here, in embodiments, a client platform wants to attest to the integrity of a software component to the remote entity and does so via the VMM 204 signing the challenge sent by the remote entity using its private key.

If an encrypted secret was included in the request for verification proof from a remote entity (block 604), then the VMM 204 decrypts the secret with its private key (block 606). In embodiments, the secret was encrypted with the public key of the VMM 204 which helps to protect against, for example, hackers who eavesdrop the communication channels. Here, the VMM 204 derives a unique key for the hidden pages in memory (block 608). In embodiments, the VMM 204 derives the unique key for the hidden pages from its own key or keys via a one-way cryptographic operation. The VMM 204 can obtain its key from the trusted platform module (TPM) as part of the measured secure boot process that loaded the VMM 204. When the TPM ascertains authenticity and integrity of the loaded VMM 204, the TPM may release its key to the VMM 204. Thus, the basis for trust can be extended from a measured VMM 204 directly to applications or components running one, two or more layers removed even in a non-trusted, unmeasured, or even compromised operating system.

The VMM 204 then stores the decrypted secret in the hidden pages in memory (block 610). As described above, protection is established around the one or more hidden pages in memory so they may only be accessed by the verified component 240.

The VMM 204 computes a cryptographic message authentication code (MAC) of the secret or data blob and of a token (block 612). In embodiments, MAC field in the token is set to all zeros. In embodiments, a data structure may be utilized that maps tokens to components or agents. Here, one token is assigned to each component and the data structure represents a mapping between the token and the data blob key for the particular component. The data blob may also identify the owning component based on the integrity manifest identifier. This information too would be in the computation of the MAC.

The VMM 204 places the computed MAC in the token (614). The VMM 204 then sends the token to the component 240, including a reference to the manifest for verification when accessing the data blob or secret in the hidden pages in memory (block 616). The data blob or secret may then be used or stored by the component 240, where the clear text can be inaccessible and may not be modified by the OS or other components.

The VMM 204 returns the signed challenge to the component 240 (block 618). The component 240 forwards the signed challenge to the remote entity (block 620). The remote entity verifies the signed challenge using the public key of the VMM 204 (block 622). Upon completion of the protocol described in FIGS. 5 and 6, the remote entity can be certain of the identity and of the version of the component 204 (e.g., VPN) that is running on the platform.

In embodiments of the invention, the protocol described above is designed to protect against man-in-the-middle (MITM) attacks. For example, having compromised OS or software stacks, sophisticated hackers may attempt at MITM attacks in order to fool the secure platform voucher mechanism. An attacker may compromise an intermediate software stack (e.g., a pass-through driver), set up a rogue VPN driver, pass the challenge to the legitimate VPN driver, and adversely pass the data to the rogue VPN driver. Subsequently, the remote entity has the correct challenge signed response, but is indeed communicating with the rogue VPN driver. To counter MITM attacks, the remote entity may encrypt the secret required by the VPN driver using the public key of the VMM 204. Here, the challenge may include the encrypted secret or data blob. Subsequently, the VMM 204 will validate the VPN driver against the remotely-provided manifest, and if the validation succeeds, then the VMM 204 decrypts the encrypted secret and places the obtained secret (for VPN connection) in the hidden memory page of the legitimate VPN driver. The legitimate VPN driver may use the secret in its hidden pages to establish its own security association with the remote entity. Since the MITM attacker and its rogue VPN driver cannot pass the verification process of the ISM 252 cooperating with the IMM 256 to authenticate and verify its integrity (block 304 of FIG. 3), the MITM attacker and its rogue VPN driver cannot get the correct secrets for the VPN connection. Thus, the rogue VPN driver has no chance to establish a VPN connection with the remote entity.

Embodiments of the invention may be used for a variety of applications (e.g., security and networking applications) and components (e.g., OS components) to store their secrets at runtime, to make their configuration and secrets secure from attack and to allow these components to reliably attest to the thrust worthiness of the system in the network. In embodiments, applications may utilize the invention to protect keys and configuration information both at runtime and while stored offline so only the properly identified components or agents can access their corresponding secrets. In embodiments, content protection applications can likewise persist their keying material rendering it inaccessible even if the underlying OS is compromised in some fundamental way, and preventing content from being accessed from compromised components. Cryptographic algorithms used for locking and unlocking the data blob may be symmetric, asymmetric or any combination thereof.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   controlling, by a hardware processor running an operating system in a platform, operation of program logic in a guest execution environment;
   identifying the program logic;
   partitioning off a portion of the program logic to control access by the operating system to the portion of the program logic;
   receiving a request from a remote entity for verification proof of integrity of the program logic, wherein the request includes a challenge;
   signing the challenge with a private key for a virtual machine monitor (VMM) of the platform; and
   returning the signed challenge to the remote entity,
   wherein the request further includes a secret encrypted with a public key of the VMM of the platform, where the encrypted secret is decrypted by the VMM using the private key of the VMM and the secret is stored in the portion of the program logic such that only the program logic has access to the secret, and wherein the program logic uses the secret to establish a security association with the remote entity; and
   wherein the VMM administers a plurality of parallel independent execution environments, including the guest execution environment, each of which has independent access to platform hardware resources and is configured to execute code on the hardware processor of the platform securely isolated from other execution environments and the VMM coordinates the access to the hardware platform resources from each of the plurality of parallel independent execution environments by monitoring and trapping register pointer changes.

2. The method of claim 1, wherein the platform is implemented as a virtual machine (VM) platform.

3. The method of claim 1, wherein the signed challenge is verifiable by the remote entity with the public key for the VMM.

4. A non-transitory machine-readable medium containing instructions which, when executed by a processing system, cause the processing system to perform a method, the method comprising:

controlling, by a hardware processor running an operating system in a platform, operation of program logic in a guest execution environment;

identifying the program logic;

partitioning off a portion of the program logic to control access by the operating system to the portion of the program logic;

receiving a request from a remote entity for verification proof of integrity of the program logic, wherein the request includes a challenge;

signing the challenge with a private key for a virtual machine monitor (VMM) of the platform; and returning the signed challenge to the remote entity, wherein the request further includes a secret encrypted with a public key of the VMM of the platform, where the encrypted secret is decrypted by the VMM using the private key of the VMM and the secret is stored in the portion of the program logic such that only the program logic has access to the secret, and wherein the program logic uses the secret to establish a security association with the remote entity; and wherein the VMM administers a plurality of parallel independent execution environments, including the guest execution environment, each of which has independent access to platform hardware resources and is configured to execute code on the hardware processor of the platform securely isolated from other execution environments and the VMM coordinates the access to the hardware platform resources from each of the plurality of parallel independent execution environments by monitoring and trapping register pointer changes.

5. The non-transitory machine-readable medium of claim 4, wherein the platform is implemented as a virtual machine (VM) platform.

6. The non-transitory machine-readable medium of claim 4, wherein the signed challenge is verifiable by the remote entity with the public key for the VMM.

7. A system comprising:

a hardware memory device, which stores program logic configured to be controlled by an operating system in a platform to operate within a guest execution environment; and management instructions, executable by a hardware processor, configured to identify the program logic and to partition off a portion of the program logic and to control access by the operating system to the portion of the program logic, wherein the program logic stored on the hardware memory device is configured to receive a request from a remote entity for verification proof of integrity of the program logic, wherein the request includes a challenge, wherein the management instructions, executable by the hardware processor is configured to sign the challenge with a private key for a virtual machine monitor (VMM) of the platform, and wherein the program logic stored on the hardware memory device is configured to return the signed challenge to the remote entity, wherein the request further includes a secret encrypted with a public key of the VMM of the platform, where the encrypted secret is decrypted by the VMM using the private key of the VMM and the secret is stored in the portion of the program logic such that only the program logic has access to the secret, and wherein the program logic stored on the hardware memory device uses the secret to establish a security association with the remote entity; and wherein the VMM administers a plurality of parallel independent execution environments, including the guest execution environment, each of which has independent access to platform hardware resources and is configured to execute code on the hardware processor of the platform securely isolated from other execution environments and the VMM coordinates the access to the hardware platform resources from each of the plurality of parallel independent execution environments by monitoring and trapping register pointer changes.

8. The system of claim 7, wherein the platform is implemented as a virtual machine (VM) platform.

9. The system of claim 7, wherein the signed challenge is verifiable by the remote entity with the public key for the VMM.

\* \* \* \* \*